June 1, 1965   H. A. SAUER   3,186,480
TEMPERATURE AND ENVIRONMENT CONTROLLING SYSTEM
Filed Oct. 16, 1962   3 Sheets-Sheet 1
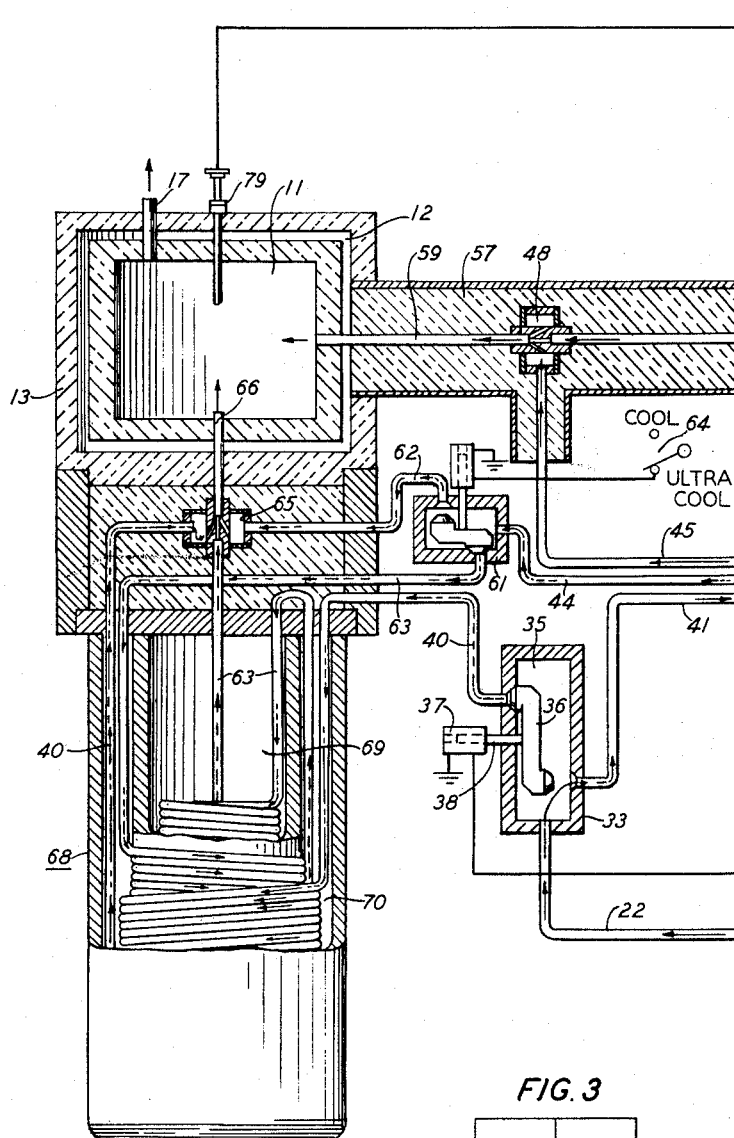
FIG. 1
FIG. 3
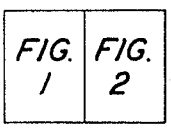
INVENTOR
H. A. SAUER
BY
Roderick B. Anderson
ATTORNEY

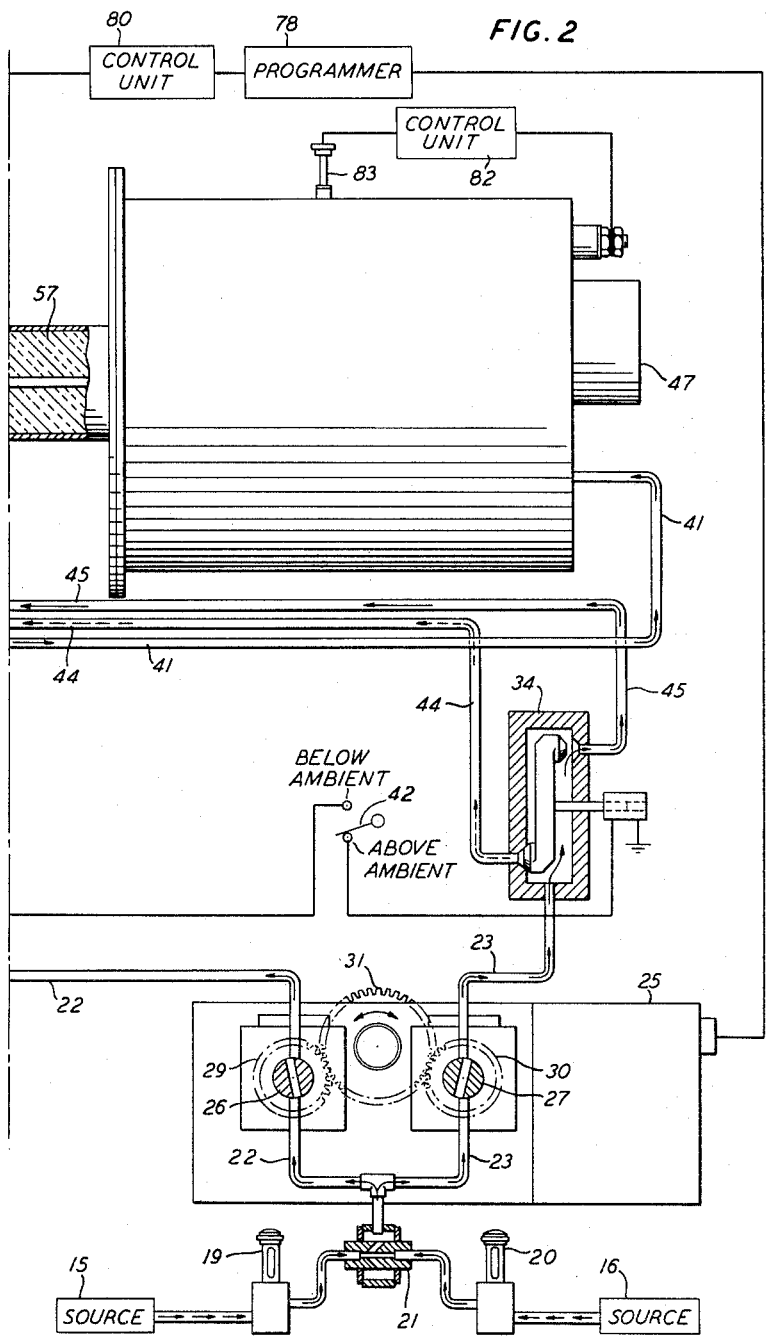

June 1, 1965 H. A. SAUER 3,186,480
TEMPERATURE AND ENVIRONMENT CONTROLLING SYSTEM
Filed Oct. 16, 1962 3 Sheets-Sheet 3
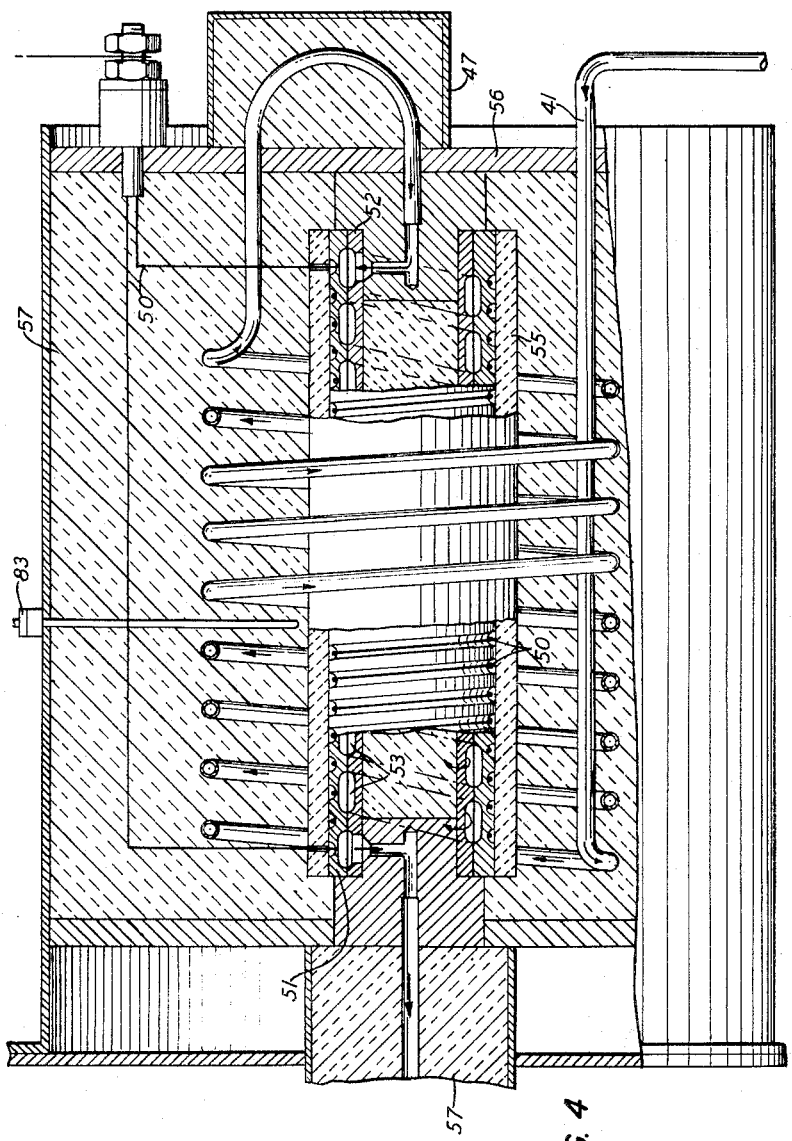
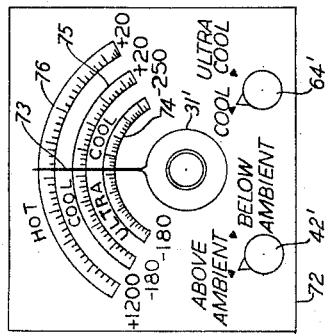
INVENTOR
H. A. SAUER
BY
Roderick B. Anderson
ATTORNEY 3,186,480
TEMPERATURE AND ENVIRONMENT
CONTROLLING SYSTEM
Harold A. Sauer, Hatboro, Pa., assignor to Bell Telephone Laboratories, Incorporated, New York, N.Y., a corporation of New York
Filed Oct. 16, 1962, Ser. No. 230,819
8 Claims. (Cl. 165—27)

This invention relates to heat exchangers and, more particularly, to heat exchangers capable of producing rapid, large temperature changes.

It has become increasingly important, particularly for studying the physical characteristics of different materials, to make rapid and large temperature changes that are at the same time accurately predictable and controllable. For example, in the study of the effects of thermal shock it may be desirable to observe the effects of a rapid temperature change from near absolute zero to several hundred degrees centigrade. Presently such laboratory study requires elaborate combinations of furnaces, cryostats, and other heat exchange equipment. It is very difficult to make rapid, accurate, and controllable temperature changes with such equipment as it presently exists.

For obvious reasons, such experimental tests usually also require accurate control of the quantity and composition of the atmosphere in which the test is made. Most heat exchange systems control the temperature in a test chamber by injecting hot or cold air in accordance with the temperature desired. This type of system results in a constant fluctuation of the quantity of gas in the test chamber and often a constant fluctuation in the composition of the gaseous atmosphere.

It is an object of this invention to provide rapid, large temperature changes in a controlled atmosphere.

It is another object of this invention to control simultaneously the temperature and gaseous composition of the atmosphere in a test chamber.

It is still another object of this invention to provide a mechanically simple and efficient heat exchanger for varying the temperature within a test chamber over a wide range.

These and other objects of the invention are attained in an illustrative embodiment thereof comprising an insulated test chamber containing a controlled atmosphere of a predetermined quantity of gas. An object is placed within the test chamber for the purpose of observing its reaction to rapid, controlled temperature changes.

In accordance with one feature of the invention the temperature in the test chamber is controlled by controlling the temperature of the gas that is injected into the chamber. The rate of flow and composition of the gas may remain substantially constant, or be altered in any predetermined way, while the temperature of the circulating gas is varied in accordance with the principles of my invention.

According to another feature of my invention the temperature of the incoming gas is controlled by mixing in proper proportions gases at two different discrete temperatures. For example, one quantity of gas may be heated to a temperature of 1200° C. while the other may be maintained at the ambient temperature of, say 20° C. By drawing approximately three-fourths of the incoming gas from the heated quantity, a net temperature of all of the incoming gas of 900° C. may be realized.

It is another feature of this invention that incoming gases be directed to heating apparatus or cooling apparatus prior to injection into the test chamber. If, in the above example, it were desired to cool the chamber to −130° C. rather than heating it, one quantity of gas would be directed to cooling apparatus to be cooled to, say, −180° C. rather than being heated. Three-fourths of the input gas would then be drawn from the cooled quantity and mixed with one-fourth portion of gas at the ambient temperature of 20° C., to give the desired temperature. On the other hand, if an above ambient temperature is desired, the input gases are directed to heating, rather than cooling, apparatus.

In accordance with my invention, the above features are implemented by transmitting input gas to two main conduits which are switched by solenoid actuated transfer valves to one of two or more pairs of branch conduits. The branch conduits transmit appropriate portions of the gas to either heating or cooling apparatus depending on how the main conduits were switched. The proportion of gas that is transmitted by a given branch conduit is regulated by a gas proportioning device that divides the total input gas between the two main conduits. Hence, to achieve a desired temperature in the test chamber, one first selects an appropriate temperature range, or "rough" temperature, by switching the two main conduits to an appropriate pair of branch conduits which are capable of either heating or cooling the gas. The proportion of gas carried by each branch conduit is regulated by adjusting the proportioning device between the two main conduits to give an accurate, or "fine," temperature selection. Since the only quantity that is regulated in securing a temperature adjustment is the proportion of input gas that goes through each branch conduit, it can be appreciated that neither the quantity nor the composition of the gas circulating through the test chamber is affected by the temperature adjustment.

In principle my invention would work with only three branch conduits: one being cooled; one being heated; and one being maintained at the ambient temperature. The two main conduits would then be switched to either the pair consisting of the low and ambient temperature branch conduits or the pair consisting of the high and ambient temperature branch conduits. In practice, however, it has been found that if extremely low temperature operation is desired, another branch conduit is advantageous for reasons of efficiency and accuracy. For example, a temperature of −230° C. can be more rapidly and accurately attained by proportioning gases between branch conduits that are cooled to −250° C. and −180° C. respectively, than by transmitting them to branch conduits that are at −250° C. and the ambient temperature.

High efficiency cooling is attained by circulating the branch conduits through concentric chambers of liquefied gas. An inner cylindrical chamber of a lower temperature liquid gas such as helium is surrounded by an annular chamber of a higher temperature liquid gas such as nitrogen. One branch conduit threads through the outer chamber and thereby cools input gases to approximately −180° C. while the other branch conduit threads first through the outer chamber to pre-cool the gaseous gases before conducting them through the inner chamber to cool them to approximately −250° C. It can be seen that the outer annular chamber serves three functions—it cools one of the branch conduits to a predetermined temperature, it pre-cools another branch conduit, and it insulates the extremely low temperature inner chamber.

High efficiency heating of the above ambient temperature branch conduit is effected by a unique high temperature heat exchanger that combines simplicity of structure with specific adaptability to the principles and concepts of the present invention. Two concentric cylinders define between them a helical channel through which input gases are conducted. Surrounding the cylinder is an electric heating wire for heating the channel. The gases are pre-heated by transmission through helical piping around the heater wires and are then heated by transmission through the directly heated helical channel between the two cylinders. The helical channel is easily manufactured by machining a helical groove on the outer surface of the inner cylinder and a matching helical groove on the inner surface of the outer annular cylinder. The two cylinders are then fitted together to define the helical channel.

It is a characteristic of the above apparatus that known servomechanism devices can be incorporated into it for insuring its accuracy. For example, a temperature-sensing device such as a thermocouple can be placed in the test chamber for generating a corrective control current to regulate the gas proportioning device if the intended temperature is not produced in the test chamber. Further, a thermocouple can be used in the high temperature heat exchanger for controlling the current through the heating wire.

These and other objects and features will be more fully appreciated from a consideration of the following detailed description, taken in conjunction with the accompanying drawing, in which:

FIG. 1 is a partially schematic illustration of part of a heat exchange system incorporating the principles of my invention;

FIG. 2 is an illustration of the remaining part of the heat exchange system;

FIG. 3 is a diagram showing how FIGS. 1 and 2 are fitted together to illustrate the entire heat exchange system;

FIG. 4 is a cross-sectional view of the above-ambient heat exchanger of FIG. 2; and FIG. 5 is a view of a temperature control device that could be used in the system of FIGS. 1 and 2.

Referring now to FIGS. 1 and 2 there is shown a heat exchange system comprising a controlled atmosphere test chamber 11 (FIG. 1) in which objects can be subjected to rapid, radical temperature changes. Accordingly, the walls of the test chamber are preferably made of a material that is capable of withstanding severe temperature changes, such as a wire mesh containing ceramic granules or various loose fiberous or foam materials which are known in the art. The test chamber is insulated by its immediate walls, an evacuated vacuum space 12, and an outer wall 13 of insulation material. Input gases of predetermined composition from sources 15 and 16 (FIG. 2) are circulated through the test chamber at a predetermined rate and are expelled from the chamber through an exhaust pipe 17.

The flow rate and composition of the input gas are regulated by rate meters 19 and 20 which, respectively, regulate the rate of flow of gases from sources 15 and 16. If sources 15 and 16 release different types of gases, meters 19 and 20 can be used together as a device for regulating the composition of the total input gases. A diffuser 21 diffuses the gases from the two sources and relays them to two main gas conduits 22 and 23. Various other devices for regulating the flow rate and gas composition could also be used; for example, any desired number of gas sources could be used.

The proportional distribution of the total input gas to the two main conduits is controlled by a gas proportioning device 25. Proportioning device 25 comprises rotary valves 26 and 27 which, respectively, control the flow of gas through main conduits 22 and 23. Mounted on valve 26 is a gear 29 and on valve 27 is a gear 30, both of which are engaged with a control gear 31. With the control gear and rotary valves in the angular positions shown, an equal quantity of gas is directed through each of the main conduits 22 and 23. If, however, control gear 31 is rotated to the right, gears 29 and 30 will be rotated to the left, and valve 26 will close to admit a smaller proportion of gas through main conduit 22 while valve 27 will open to admit a larger proportion through conduit 23. Conversely, rotation of control gear 31 to the left will channel a greater proportion of gas through main conduit 22 than through conduit 23.

After leaving the gas proportioning device, the input gas is transmitted by main conduit 22 to a transfer valve 33, and by main conduit 23 to a transfer valve 34. Transfer valve 33 comprises an inner chamber 35, a transfer member 36, a solenoid 37, and a solenoid core 38 that is connected to the transfer member. Leading from the chamber of the transfer valve are two branch conduits 40 and 41. With the solenoid core in the position shown, transfer member 36 seals off branch conduit 40 from inner switching device chamber 35 and all of the input gas from main conduit 22 is directed to branch conduit 41. Solenoid 37 is connected in a known manner to a current source through a control switch 42. When the control switch is thrown to contact the lead wire from the solenoid, the solenoid core moves to the right so that branch conduit 41 is sealed off from chamber 35 and input gas is directed to branch conduit 40. Transfer valve 34 works in the same manner; with control switch 42 in the position shown branch conduit 44 is sealed off and all of the gas is directed to branch conduit 45, while with the switch in the opposite position, all of the gas would be directed along branch conduit 44.

It is to be noted that since both transfer valves are operated through control switch 42, input gas flows either through branch conduits 41 and 45 simultaneously or through branch conduits 40 and 44. With control switch 42 in the position shown, input gas travels from transfer valve 33 to test chamber 11 via branch conduit 41, a high temperature heat exchanger 47 and a gas diffuser 48. Another predetermined portion of gas flows to the test chamber from transfer valve 34 via branch conduit 45 and gas diffuser 48.

Referring to FIG. 4, the gas in branch conduit 41 is heated by the heat exchanger 47 which comprises an electrical heating wire 50 which surrounds a cylinder 51. A helical groove is machined in the inner surface of cylinder 51 which is aligned with a corresponding helical groove in the outer surface of an inner cylinder 52 to form a helical channel 53. Cylinders 51 and 52 together constitute an inner core for heating gases that flow along helical channel 53. Surrounding cylinder 51 is an outer core 55 of insulating material such as ceramic. All of these elements are encased within an outer wall 56 and insulated, preferably by a bulky, loose insulating material 57 which may be composed of any of a number of well-known materials. This type of insulating material 57 is also used to insulate gas diffuser 48 and associated elements.

Branch conduit 41 enters heat exchanger 47 through outer wall 56 and describes a helical path around the outer core 55. The gases are preheated as they travel around this helical path and are then directed into helical channel 53 where they are directly heated by cylinders 51 and 52. Besides preheating transmitted gases, the helical portion of conduit 41 effectively insulates the heater so that the temperature of surrounding apparatus is not undesirably heated.

After being heated to a high temperature of, for example, 1200° C. the gases from heat exchanger 47 are directed, as shown in FIG. 1, to the gas diffuser 48 where they are mixed with ambient temperature gases from branch conduit 45. The mixed input gases are then injected into test chamber 11 through an injection conduit 59. It is to be noted that with switch 42 in the position shown, all of the input gases are transmitted through injection conduit 59. The proportion of these gases that are heated to a high temperature depends upon the angular position of control gear 31 of the gas proportioning device 25.

The path of the gases with switch 42 in a position opposite that shown in the drawing is indicated by dashed arrows. With the switch in this position branch conduit 44 transmits gas from transfer valve 34 to another transfer valve 61. Transfer valve 61 operates in the same manner as transfer valves 33 and 34 to relay gas from branch conduit 44 to either of two branch conduits 62 or 63 depending upon the position of a control switch 64. With control switch 64 in the position shown, gas from branch conduit 44 is injected directly into test chamber 11 via branch conduit 62, gas diffuser 65, and injection conduit 66 without being either heated or cooled.

If, however, switch 64 were in the opposite position input gas would be transmitted to a low temperature heat exchanger 68 via branch conduit 63. Low temperature heat exchanger 68 comprises an inner cylinder chamber 69 concentrically surrounded by an annular chamber 70. The inner chamber may be filled with a very low temperature liquid gas such as liquid helium while the annular outer chamber may be filled with a relatively higher temperature liquid gas such as liquid nitrogen. Branch conduit 63 threads first through the outer chamber 70 to pre-cool the transmitted gas, and then meanders through the inner chamber 69 to ultracool the gas to near liquid helium temperature. The ultracooled gas is then transmitted to gas diffuser 65 and test chamber 11 via injection conduit 66.

Gas from either branch conduits 62 or 63 from transfer valve 61 is always mixed in diffuser 65 with gas from branch conduit 40. Branch conduit 40 leads from transfer valve 33 only through outer chamber 70 to the gas diffuser. With switch 64 in the position shown, gas from branch conduit 40 at a temperature of, say, —180° C. is mixed with ambient temperature gas to yield a cool gas mixture. With switch 64 in the opposite position, it is mixed with gas from branch conduit 63 that is cooled to, say, —250° C., to yield an ultracool mixture. Again, the proportion of total gas that flows through the branch conduits is regulated by proportioning device 25. It should be pointed out that any of numerous coolants may alternatively be used in chambers 69 and 70. Also, substantial temperature differentials between branch conduits 40 and 63 can be realized even if chambers 69 and 70 contain the same coolant.

For purposes of summarizing the operation of the heat exchange system, it is perhaps advisable to consider all of the controls as being manually operated. Referring to FIG. 5, there is shown a control panel 72 having a rough temperature selection knob 42' for operating control switch 42, a rough temperature selection knob 64' for operating control switch 64, and a fine temperature selection knob 31' for operating control gear 31 of the gas proportioning device 25. The two positions of knobs 42' and 64' correspond to the two positions of switches 42 and 64 and are labelled accordingly. An indicator 73 on the fine temperature selection knob 31' extends over three scales 74, 75, and 76 which give temperature selections over three different ranges depending on the positions of rough selection knobs 42' and 64'. Scale 76 gives temperature selections over the "hot" temperature range, scale 75 over the "cool" temperature range, and scale 74 over the "ultracool" temperature range. With knob 42' directed to the above ambient position, the fine temperature selection is given by scale 76, and in the examples used heretofore, the range of temperature selection is from 20° C. to 1200° C.

With the selection knobs 42', 64', and 31' in the position shown in FIG. 5, the input gas will follow the paths indicated by the solid arrows in FIGS. 1 and 2. If the fine selection knob is pointed to the extreme right, control gear 31 of FIG. 2 will close main conduit 22 and all of the input gas will flow through main conduit 23, branch conduit 45 and injection conduit 59. If the ambient temperature is taken as +20° C., the temperature of the test chamber will be +20° C. as indicated at the extreme right of scale 76.

As another example, suppose rough selection knobs 42' and 64' were switched to the extreme right. Their corresponding control switches 42 and 64 would then be switched to positions opposite those shown in FIGS. 1 and 2. Input gas would flow through main conduit 22, branch conduit 40, through outer chamber 70, to gas diffuser 65; and through main conduit 23, branch conduit 44, and branch conduit 63, through inner chamber 69, to gas diffuser 65. At diffuser 65, gas from branch conduit 40 at —180° C. would mix with gas from branch conduit 63 at —250° C., to yield a mixture at some temperature between. The exact temperature would be selected by pointing indicator 73 of FIG. 2 to the proper temperature on the ultracool scale 74.

By examining other temperature selections in the manner described, the ease with which rapid, accurate, and extreme temperature changes can be made is quite obvious. Many laboratory experiments and industrial processes also require accurate predetermined changes of temperature with respect to time. For example, a change of temperature from —250° C. to +1200° C. at a predetermined rate can be effected by switching knobs 42' and 64' and indicator 73 to the extreme right, at which time switch 64' is switched to the left position. Indicator 73 is then rotated at the desired rate to the extreme left, at which time switch 64' is switched to the left position. Indicator 73 is then rotated to the right with the precise temperature at any time being given by the cool scale 75. Upon reaching the 20° C. indication, switch 42' is switched to the left position, and indicator 73 is rotated at the desired rate to the left to the 1200° C. indication. Hence a smooth transition can easily be made over an extremely wide temperature range at practically any desired rate.

In actual practice it has been found to be more practical and accurate to control temperature changes automatically, rather than manually. In the system of FIGS. 1 and 2 a programmer 78 is used to control automatically the movements of control gear 31 in accordance with a prepared set of instructions, or program. Programmer 78 may, for example, be apparatus that is sold commercially by the Leeds and Northrup Company under the name "Speedomax Type G Recorder, Model S 60000 Series," in conjunction with their "10170 Program Control Unit" and associated timers. Although switches 42 and 64 are shown as being manually operated, they could also be designed to be operated automatically.

It has also been found to be convenient to include a servomechanism circuit to make compensatory adjustments of control gear 31 in accordance to and in concert with the above programming unit in the event of deviations from predetermined temperatures of the heated, cooled, ultracooled, or ambient temperature gases. This can be accomplished by a thermocouple 79 and a control unit 80 which may be of the type sold commercially by the Leeds and Northrup Company under the name "Series 60 Control Using 3-Action P.A.T. Control Unit." The thermocouple 79 generates an electric current in response to the temperature in test chamber 11. This current operates control unit 80 which, in turn, corrects the control current that is transmitted by programmer 78 to regulate the movement of control gear 31. Of course, such a correction is made only if the actual temperature in the test chamber does not correspond with the programmed temperature of programmer 78. A similar control unit 82 in conjunction with a thermocouple 83 advantageously controls the electrical power conducted by heating wire 30. For example, a deviation of generated heat from a set temperature of 1200° C. would produce a corrective current that would adjust the electrical power delivered to heating wire 50.

In summary, it can be appreciated that numerous modifications can be made to the heat exchange system of FIG. 1 in accordance with any of a wide variety of requirements. For example, the unique high temperature heat exchanger 47 and low temperature heat exchanger 68 offer the advantages of efficiency and simplicity of structure, but they are not indispensable to the operation of the generic combination because other heat exchangers could be substituted for them. Also, it is often convenient to include apparatus for automatically controlling the rate of flow of input gas and for controlling the composition of the input gas. These modifications are particularly suitable because, in accordance with the invention, the rate of flow and composition of the input gas are independent of temperature. Valve arrangements similar to proportioning device 25 can conveniently be employed for these purposes. Various other modifications can be made by those skilled in the art without departing from the spirit and scope of the invention.

What is claimed is:

1. A temperature and environment controlling system comprising:
   a test chamber;
   means for transmitting gases to the test chamber comprising at least three branch conduits;
   means for maintaining a first branch conduit at a relatively high temperature;
   means for maintaining a second branch conduit at a relatively low temperature;
   means for maintaining the third branch conduit at a temperature intermediate the high and low temperatures;
   a source which transmits input gases at a predetermined rate of flow;
   means for controlling and adjusting the proportion of input gas that is transmitted to each of the main conduits;
   means for selectively connecting the two main conduits to two of the branch conduits;
   and means connected to the test chamber and the first, second, and third branch conduits for intermixing the input gases immediately prior to their injection into the test chamber.

2. In a controlled environment system of the type employing a test chamber through which gases of a predetermined composition are circulated at a predetermined rate, apparatus for controlling the temperature of the test chamber comprising:
   means for dividing the flow of the gases into two main conduits before it is transmitted to the test chamber, and for adjusting the proportion of the total quantity of gases that are transmitted by each of the main conduits;
   first, second, third, fourth, fifth, and sixth branch conduits for transmitting the gases between the main conduits and the test chamber;
   a first transfer valve connected to one of the main conduits and comprising means for alternatively connecting the main conduit to either the first or second branch conduit;
   means for heating the first branch conduit to a first temperature;
   means for cooling the second branch conduit to a second temperature below the first temperature;
   a second transfer valve connected to the other main conduit and comprising means for alternatively connecting the other main conduit to either the third or fourth branch conduit;
   means for maintaining part of the third branch conduit at a third temperature intermediate the first and second temperatures; and
   a third transfer valve comprising means for alternatively connecting the fourth branch conduit to either the fifth or sixth branch conduit;
   means for maintaining part of the fifth branch conduit at substantially the third temperature;
   means for maintaining the sixth branch conduit at a fourth temperature which is substantially lower than the second temperature;
   all of the branch conduits except the fourth one being coupled to the test chamber;
   and means for intermixing gases of different temperature prior to their injection into the test chamber.

3. A temperature and environment controlling system comprising:
   a test chamber;
   cooling means including a below-ambient temperature heat exchanger comprising an inner chamber adapted to contain a lower temperature liquid gas surrounded by an annular outer chamber adapted to contain a higher temperature liquid gas;
   heating means including an above-ambient temperature heat exchanger for generating heat;
   a source of input gaseous gas at the ambient temperature;
   means for proportioning the input gas between two main conduits;
   a first transfer valve for interconnecting one of the main conduits to a first conduit leading to the test chamber or to a second conduit leading to a second transfer valve;
   said first transfer valve further comprising means for interconnecting the other main conduit to a conduit leading to the above-ambient temperature heat exchanger and thence to the test chamber and a conduit which meanders through the outer chamber of the below-ambient temperature heat exchanger and leads thence to the test chamber;
   said second transfer valve comprising means for switching said second conduit between a conduit leading to the test chamber and a conduit which meanders through the inner chamber of the below-ambient temperature heat exchanger and leads thence to the test chamber;
   and means for mixing the input gas prior to injection into the test chamber.

4. In combination:
   an inner chamber adapted to contain liquefied gas;
   an outer annular chamber concentrically surrounding said inner chamber and being adapted to contain liquefied gas;
   a controlled atmosphere chamber;
   a first pipe coupled to the controlled atmosphere chamber and meandering through the outer chamber;
   a second pipe coupled to the controlled atmosphere chamber and meandering through both the inner and outer chambers;
   a source of input gas;
   means connected to the source for proportioning the gaseous gas between the first and second pipes;
   and means located between the controlled atmosphere chamber and the inner and outer chambers for mixing input gas prior to injection into the controlled atmosphere chamber.

5. A temperature and environment controlling system comprising:
   a chamber;
   a source of input gases;
   means for proportioning the flow of input gases between two main conduits;
   means for selectively connecting the two main conduits to one of two pairs of branch conduits;
   a first device for intermixing gases and injecting them into the chamber;
   a second device for intermixing gases and injecting them into the chamber;
   one of the pairs of branch conduits being connected to the first intermixing device and the other pair of branch conduits being connected to the second intermixing device;
   means for heating one of the branch conduits of one of the pairs to a relatively high temperature;
   and means for cooling one of the branch conduits of the other pair to a relatively low temperature.

6. A temperature and environment controlling system comprising:
   an inner chamber adapted to contain a first liquefied gas;
   an outer chamber concentrically surrounding said inner chamber and adapted to contain a second liquefied gas having a higher boiling point than said first gas;
a test chamber;
a source of input gaseous gas;
first means for transmitting input gas to the test chamber comprising a first pipe meandering through said inner chamber;
second means for transmitting input gas to said test chamber comprising a second pipe meandering through said outer chamber;
a device for sensing the temperature in said test chamber;
and a proportioning valve connected to said source and to said first and second pipes;
said valve being at least partially controlled by the temperature sensing device.

7. The temperature and environment controlling system of claim 1 wherein:
the means for maintaining the first branch conduit at a relatively high temperature comprises a first cylinder and a hollow second cylinder;
the first cylinder being of thermally conductive material having a helical groove around its outer surface;
the hollow second cylinder being of thermally conductive material coaxially surrounding the first cylinder and being contiguous thereto;
the second cylinder having a helical groove around its inner surface which is of the same size and pitch, an aligned with, the helical groove on the outer surface of the first cylinder, whereby a helical channel is defined between the first and second cylinders;
a heating wire coaxially surrounding the second cylinder and contiguous thereto;
a hollow third cylinder of thermally insulating material coaxially surrounding the heating wire and the second cylinder;
and wherein the first branch conduit comprises an input pipe and an output pipe;
the input pipe being selectively connected at one end to one of the main conduits, having a helical portion that coaxially surrounds the third cylinder, and being connected at its other end to the helical channel;
the output pipe being connected to the other end of the helical channel.

8. In a controlled environment system of the type employing a test chamber through which gases of a predetermined composition are circulated at a predetermined rate, apparatus for rapidly and accurately adjusting the temperature within a test chamber without interfering with the predetermined rate of circulation comprising:
means for dividing the gas into two main conduits before it is injected into the test chamber;
a first pair of branch conduits;
a second pair of branch conduits;
means for heating one of the branch conduits of the first pair to a relatively high temperature;
means for cooling one of the branch conduits of the second pair to a relatively low temperature;
means for connecting the two main conduits to the first pair or to the second pair;
all of said branch conduits being coupled at one end thereof to the test chamber;
and means for regulating the proportion of gas that is injected into the two main conduits.

References Cited by the Examiner

UNITED STATES PATENTS

| | | | |
|---|---|---|---|
| 666,693 | 1/01 | Place | 62—514 |
| 983,912 | 2/11 | Lovekin | 127—99 |
| 2,003,496 | 6/35 | Roe | 219—365 |
| 2,671,643 | 3/54 | Gordon | 165—27 |
| 2,737,028 | 3/56 | Marchlanski | 165—26 X |
| 2,943,459 | 7/60 | Rind | 62—514 |

CHARLES SUKALO, *Primary Examiner.*